United States Patent [19]

Okamura et al.

[11] Patent Number: 4,868,063
[45] Date of Patent: * Sep. 19, 1989

[54] GLASS FIBER ARTICLE-COATING COMPOSITIONS

[75] Inventors: Yoshio Okamura; Kimitaka Kumagae; Hideyuki Itoh; Shigeru Mori, all of Annaka, Japan

[73] Assignee: Shin-Etsu Chemical Co., Ltd., Tokyo, Japan

[ * ] Notice: The portion of the term of this patent subsequent to Jan. 26, 2005 has been disclaimed.

[21] Appl. No.: 76,230

[22] Filed: Jul. 22, 1987

[30] Foreign Application Priority Data

Jul. 22, 1986 [JP] Japan ................................. 61-172507

[51] Int. Cl.$^4$ ................................................ B32B 9/00
[52] U.S. Cl. ..................................... 428/429; 524/862; 427/387; 528/15; 528/31; 528/32; 525/478
[58] Field of Search ............................. 528/15, 32, 31; 525/478; 524/862; 428/429; 427/387

[56] References Cited

U.S. PATENT DOCUMENTS

| | | | |
|---|---|---|---|
| 4,061,609 | 12/1977 | Bobear | 528/15 |
| 4,196,273 | 4/1980 | Imai et al. | 528/15 |
| 4,426,240 | 1/1984 | Louis et al. | 428/429 |
| 4,704,408 | 11/1987 | Krug | 528/15 |
| 4,721,764 | 1/1988 | Fujiki et al. | 528/32 |

Primary Examiner—Melvyn I. Marquis
Attorney, Agent, or Firm—Birch, Stewart, Kolasch & Birch

[57] ABSTRACT

A composition for coating glass fiber articles such as glass sleeve, glass cloth, glass roving, glass tape, glass mat or glass nonwoven fiber, comprising (a) a diorganopolysiloxane end-blocked with a divinyl-monoorganosilyl or trivinylsilyl radical at both ends, (b) a sufficient amount of an organohydrogenpolysiloxane containing at least two silicon-bonded hydrogen atoms per molecule to provide at least 0.5 silicon-bonded hydrogen atoms per vinyl radical in component (a), and (c) a catalytic amount of platinum or a platinum compound.

16 Claims, No Drawings

GLASS FIBER ARTICLE-COATING COMPOSITIONS

BACKGROUND OF THE INVENTION

This invention relates to a composition for coating glass fiber articles. More particularly, it relates to a silicone coating composition having improved curing properties, capable of forming a cured film having improved flexibility, electrical insulating properties, and heat resistance, and suitable for the treatment of glass fiber articles such as glass sleeve, glass cloth and glass tape.

In these years, most electric appliances are required to be more multifunctional and compact, and electrical insulating materials for such electric appliances are often used in complicated bent shapes or under various environments including a high temperature environment near heating elements or a high humidity environment. There is a need for electrical insulating materials capable of maintaining good electrical insulating properties upon exposure to severe environments as mentioned above while exhibiting excellent flexibility and heat resistance.

Typical of conventional electrical insulating materials are glass fiber articles in the form of a glass sleeve, glass cloth or glass tape coated with organopolysiloxane compositions. Exemplary well-known organopolysiloxane compositions are those comprising an organopolysiloxane having a monovinyldiorganosilyl radical at both ends thereof, an organohydrogenpolysiloxane containing a hydrogen atom attached to a silicon atom, and a platinum curing catalyst as disclosed in Japanese Patent Publication Nos. 51-37399, 51-46880 and 53-13505, and Japanese Patent Application Kokai Nos. 52-63495 and 55-154354.

These organopolysiloxane compositions crosslink and cure through relatively brief heating into flexible coatings having electrical insulation and heat resistance. These films, however, do not perform well under severe conditions as described above.

Various attempts have been made on the above-mentioned organopolysiloxane compositions to produce more flexible coatings, for example, by increasing the molecular weight of vinyl radical-containing organopolysiloxane in the composition, or decreasing the content of vinyl radical in the organopolysiloxane or active hydrogen in organohydrogenpolysiloxane to reduce the degree of crosslinking of the entire composition. This method, however, adversely affects curing of organopolysiloxane compositions, which suffer from many troubles due to undercure, including formation of a tacky coating by curing under usual heating conditions, or a cured coating having substantially reduced strength and dielectric properties. Extended heating at a higher temperature also leads to a loss of productivity.

It is common practice to color electrical insulating materials for the purpose of identifying wires and parts. Many pigments and dyes used as colorants are poisons to platinum catalysts. The addition of a colorant to an organopolysiloxane composition as formulated above invites some problems in that curing is retarded and the resulting coatings exhibit poor dielectric properties. The deleterious effect of the catalyst poison is more serious with those compositions wherein the vinyl radical content of organopolysiloxane or the active hydrogen radical content of organohydrogenpolysiloxane is reduced to improve the flexibility of the resulting coatings. When the amount of platinum catalyst is increased to compensate for a loss of curing, not only is the coating composition undesirably increased in cost because of the expensive platinum catalyst, but it has a reduced pot life because of a viscosity rise and gelation. It has been quite difficult to find a good compromise between coating flexibility and poisoning resistance.

SUMMARY OF THE INVENTION

It is an object of the present invention to provide a composition for coating glass fiber articles which can avoid the use of a large amount of platinum catalyst and maintain curing properties even when a colorant is added.

It is another object of the present invention to provide such a coating composition which quickly cures even at relatively low temperatures.

It is still another object of the present invention to provide such a coating composition which can form a highly flexible and heat-resistant coating on glass fiber articles such as glass sleeve, glass cloth and glass tape wherein the cured coating maintains its excellent dielectric properties substantially unchanged upon exposure to a severe, high temperature and/or high humidity environment.

We have discovered that a heat-resistant, flexible rubbery coating free of any undercure having improved electrical properties can be formed on glass fiber articles by heat curing thereto a coating composition comprising (a) an organopolysiloxane containing a vinyl functional radical, (b) an organohydrogenpolysiloxane containing at least two silicon-bonded active hydrogen atoms in its molecule, and (c) a platinum catalyst wherein component (a) is a diorganopolysiloxane being end-blocked with a divinylmonoorganosilyl or trivinylsilyl radical at both ends, at a relatively low temperature for a relatively short period. It has also been discovered that this coating composition is fully resistant to catalyst poisoning. Thus the composition can achieve the objects by solving the above-described problems including deterioration of dielectric properties due to undercure without taking into account any compromise between flexibility and cure which is otherwise of interest when component (a) is a conventional known diorganopolysiloxane containing a monovinyldiorganosilyl radical at both ends thereof.

According to the present invention, there is provided a composition for coating glass fiber articles, comprising (a) a diorganopolysiloxane end-blocked with a divinylmonoorganosilyl or trivinylsilyl radical at both ends, (b) a sufficient amount of organohydrogenpolysiloxane containing at least 0.5 silicon-bonded hydrogen atoms per vinyl radical in component (a), and (c) a catalytic amount of platinum or a platinum compound.

The above and other objects, features and advantages of the present invention will be more apparent from the following description.

DETAILED DESCRIPTION OF THE INVENTION

The coating composition for glass fiber articles according to the present invention utilizes as vinyl functional radical-containing organopolysiloxane component (a) a diorganopolysiloxane end-blocked with a divinylmonoorganosilyl or trivinylsilyl radical at both ends thereof. No particular limitation is imposed to the diorganopolysiloxane so long as it has the above-described structure. Particularly preferred diorganopolysiloxane is of the general formula:

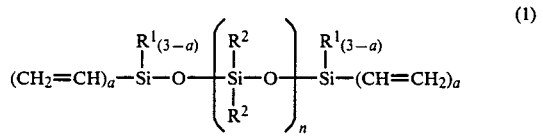
(1)

wherein $R^1$ is methyl or phenyl radical, $R^2$ is a monovalent hydrocarbon radical, "a" is a positive integer of 2 or 3, and "n" is an integer of at least 50.

Illustrative monovalent hydrocarbon radicals of $R^2$ include alkyl radicals such as methyl and ethyl radicals, aryl radicals such as phenyl radical and a vinyl radical, or a mixture thereof. $R^1$ and $R^2$ may comprise at least 50 mol %, preferably at least 70 mol % of methyl radical for the reasons of cost, flexibility and ease of preparation. An aryl radical may partially be incorporated to increase the heat resistance. An aryl radical content of up to 30 mol % is preferred mainly for economic reason. Vinyl radical may also be incorporated in the diorganopolysiloxane as the monovalent hydrocarbon radical of $R^2$ to improve the cure and strength of the coating. Since an excess amount of vinyl radical in $R^2$ detracts from the flexibility and heat resistance of the coating, the content of vinyl radical employed is preferably not more than 0.5 mol %. In formula (1), n is preferably at least 50 for the flexibility of the cured film. Preferably, the upper limit of n is set at 100,000 by taking into account viscosity and solubility in solvent. When n exceeds the upper limit, the composition becomes so viscous that it becomes difficult to apply even when it is dissolved in a solvent. Preferably, n is 500 to 10,000 in view of flexibility and application.

The coating composition of the present invention contains an organohydrogenpolysiloxane containing at least two silicon-bonded hydrogen atoms (active hydrogens) per molecule as component (b). This component (b) is a curing agent which reacts and crosslinks with component (a) and serves to provide the coating composition with flame retardance and adhesion to glass fiber articles.

The organohydrogenpolysiloxane used as component (b) in the practice of the present invention must have at least two silicon-bonded hydrogen atoms (active hydrogens) per molecule. Illustrative but non-limiting examples of the organohydrogenpolysiloxanes include those represented by the formulae:

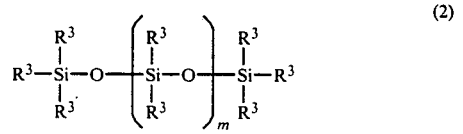
(2)

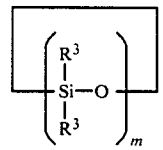
(3)

-continued and $$R_b{}^3 SiO_{\frac{4-b}{2}} \quad (4)$$

wherein $R^3$ is selected from hydrogen, alkyl radicals such as methyl and ethyl radicals or aryl radicals such as phenyl radical, or a mixture thereof, with the proviso that at least two $R^3$ radicals are hydrogen atoms, m is a positive integer of at least 3, and b is from 1.5 to 2.0. $R^3$ may comprise at least 70 mole %, preferably at least 90 mole % of methyl radical and 0 to 30 mole %, preferably at least 0 to 10 mole % of aryl radicals. Preferably, m is 5 to 500.

Component (b) is used in an amount sufficient to provide at least 0.5 hydrogen atoms of component (b) per vinyl radical of component (a). When the amount of hydrogen atoms of component (b) are not enough, component (b) does not exert a sufficient curing effect and the cured coating has low strength and dielectrical properties. When an excess amount of hydrogen atoms of component (b) is present, for example, when the number of hydrogen atoms in component (b) is larger than that of vinyl radicals in component (a) by a factor of one hundred, the cure and other properties of the coating are impaired. Therefore, the number of hydrogen atoms in component (b) may preferably not exceed a hundred times that of vinyl radicals in component (a).

The coating composition of the present invention contains a platinum catalyst as component (c). Illustrative but non-limiting examples of the platinum catalysts include chloroplatinic acid, platinum complex compounds, and metallic platinum on an inorganic carrier such as carbon powder. The amount of platinum catalyst employed is a catalytic amount, which is typically in the range from 1 to 200 parts, preferably in the range from 5 to 50 parts of platinum per million parts by weight of component (a). With a smaller amount of platinum catalyst employed, the coating composition cures too slowly. A too larger amount of the catalyst results in an expensive coating composition having a reduced pot life.

Other ingredients may be added to the coating composition described herein in addition to the afore-mentioned components (a), (b) and (c) if desired. Illustrative additional ingredients include inorganic fillers, for example, finely divided silicas having a surface area of at least 110 m²/g, such as fumed silica, silica aerogel and precipitated silica, and these finely divided silicas surface-treated with a halogenated silane, silazane and alkoxysilane.

These inorganic fillers improve the physical strength and flame retardance of the cured coating. The inorganic fillers are blended preferably in amounts from 0 to 30 parts by weight per 100 parts by weight of component (a). A larger amount of fillers blended beyond the above-defined range gives a viscous coating composition which does not well flow upon application.

The coating composition may further contain other additives, for example, retarders for extending the pot life thereof, such as acetylene alcohols, nitriles, phosphates, and low molecular weight vinyl-containing siloxanes; and flame retardants and heat resistance-imparting agents such as iron oxide, iron octylate, cerium oxide, ceriumoctylate, aluminum hydroxide, zinc oxide, zinc carbonate, mica powder, and talc powder.

Colorants including pigments such as titanium oxide, cobalt oxide, chromium oxide, carbon and the like and dyes such as phthalocyanine blue, phthalocyanine green and the like may also be blended in an amount of 0 to 15 parts by weight per 100 parts by weight of the component (a).

The coating composition of the present invention may be applied to glass fiber articles by any method known in the art, for example, dipping, impregnating and coating. Curing is normally effected by heating to form a cured film on the glass fiber articles. The coating composition may be utilized as it is, or as a solution by dissolving and diluting in a solvent to a concentration or viscosity convenient to apply. Illustrative but non-limiting solvents used herein include hydrocarbon solvents such as toluene, stylene, rubber solvent and naphtha; halide solvents such as perchloroethylene and 1,1,1-trichloro-ethane; and polar solvents such as esters and ketones. They may be used alone or in admixture of two or more.

As described above, the present coating composition is applied onto glass fiber articles to a predetermined coating weight by dipping, impregnating or coating and thereafter heat treated. The heat treatment may be carried out, for example, at 100° to 250° C. for 1 to 30 minutes. If desired, the glass fiber articles may previously be subjected to heat cleaning or various pretreatments with primers, silane coupling agents and low molecular weight hydrogenpolysiloxanes.

No particular limit is imposed on the glass fiber articles which can be treated with the coating composition of the present invention. Examples of the glass fiber articles include glass sleeve, glass cloth, glass roving, glass tape, glass mat, glass nonwoven fabric and the like.

The coating composition for glass fiber articles according to the present invention is cured at a relatively low temperature in a relatively short time. The cure of the coating composition is not inhibited by the addition of colorants, and there is thus no need to add a larger amount of platinum catalyst. The coating composition cures to a film which has improved properties including dielectric properties, flexibilty, and heat resistance, and maintaining such properties even under severe conditions at high humidity and high temperature. Therefore, silicone-coated glass fiber articles prepared by utilizing the coating composition of the present invention are suitable for use as electrical insulating materials and the like.

In order that those skilled in the art might be better able to practice the present invention, the following examples and comparative examples are provided by way of illustration and not by way of limitation. All parts are by weight unless otherwise stated.

EXAMPLES

EXAMPLE 1

A coating composition for glass fiber articles was prepared by mixing 20 parts of dimethylpolysiloxane raw rubber end-blocked with a trivinylsilyl group at both ends and having a viscosity of 10,000 centipoises as measured at 25° C. in 30% xylene solution, 1.0 part of hydrogenpolysiloxane of average formula:

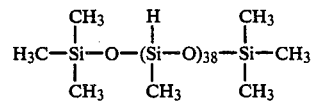

a sufficient amount of isopropyl alcohol solution of 2% chloroplatinic acid to provide 20 parts of platinum per million parts by weight of the raw rubber, and 80 parts of xylene.

A glass sleeve having an inner diameter of 3 mm was coated with the thus prepared coating composition by dipping it in the composition and then heating it at 140° C. for 10 minutes. The procedure was repeated three times to form a coating in a weight of 3.2 gram per meter of the glass sleeve in a longitudinal direction.

The coating appeared colorless, transparent and uniform, and was tack-free and very flexible.

The dielectric breakdown voltage (DBV) of the thus coated glass sleeve was measured to be 6.5 kV (kilovolts) in a normal state, 6.3 kV after it was kept at a relative humidity (RH) of 100% for 24 hours, and 6.5 kV after it was heated at 250° C. for 24 hours. No significant difference was recognized between the initial value and the values after moisturizing or heating, indicating excellent electrical properties of the coated glass sleeve.

COMPARATIVE EXAMPLE 1

A coating composition was prepared by repeating Example 1 except that the raw rubber of Example 1 was replaced by dimethylpolysiloxane raw rubber end-blocked with a monovinyldimethylsilyl radical at both ends having a viscosity of 10,000 centipoises as measured at 25° C. in 30% xylene solution. A glass sleeve was coated as in Example 1.

The resulting film on the glass sleeve had a coating weight of 3.2 g/m. The film was very tacky although it was flexible.

The dielectric breakdown voltage of the coated glass sleeve was 5.7 kV in a normal state, 3.9 kV after it was kept at 100% RH for 24 hours, and 5.9 kV after it was heated at 250° C. for 24 hours. As shown by a variation of DBV with moisturizing or heating, this glass sleeve failed to show stable electrical properties.

EXAMPLES 2 AND 3, AND COMPARATIVE EXAMPLES 2 AND 3

In 100 parts of dimethylpolysiloxane having divinylmethylsilyl radicals at both ends thereof, and having a viscosity at 7,500 centipoises at 25° C. was uniformly dispersed 10 parts of fumed silica powder surface treated with trimethylchlorosilane having a specific surface area of about 130 m²/g. To this mixture, 1.5 parts of hydrogenpolysiloxane (I) employed in Example 1, 0.3 parts of 2-methyl-3-butyn-2-ol, a pot life extending agent commercially available under the trade name of Olfin B from Nisshin Chemical Industry K.K., and an ethylhexanol solution of 2% chloroplatinic acid in an amount sufficient to provide 10 ppm of platinum based on said dimethylpolysiloxane were added and mixed to prepare a coating composition of Example 2.

This coating composition was heat treated at 140° C. for 10 minutes into a rubbery elastomer having a rubber hardness of 26 according to the Japanese Industrial Standard (JIS), an elongation of 410% and a tensile strength of 42 kg/cm².

To examine poisoning of the catalyst by a colorant, 3.5 parts by weight of a black dye commercially available as Colortex Black #720 from Sanyo Shikiso K.K. was added to 100 parts of the coating composition prepared above. Mixing resulted in a uniform coating composition of Example 3.

For comparison purposes, coating compositions of Comparative Examples 2 and 3 were prepared in the same manner as Examples 2 and 3, except that the divinylmethylsilyl end-blocked dimethylpolysiloxane was replaced by dimethylpolysiloxane having monovinyldimethylsilyl radicals at both ends thereof and having a viscosity of 7,500 centipoises at 25° C.

The coating composition of Comparative Example 2 remained tacky after heating at 140° C. for 10 minutes. By heating at 180° C. for a further 60 minutes, it was thoroughly cured into a rubbery elastomer having a rubber hardness of 26 according to JIS, elongation of 390%, and a tensile strength of 40 kg/cm².

These coating compositions were die coated onto heat-cleaned glass sleeves having an inside diameter of 1 mm, and heat treated at 150° C. for 10 minutes and then at 180° C. for 60 minutes, respectively. The resulting glass sleeves were examined for coating weight, tack, and dielectric breakdown voltage (DBV) both in a normal state and after aging at 100% RH for 24 hours. The results are shown in Table 1.

its molecular chain, the balance being all methyl radicals, and having a viscosity of 5,000 centipoises as measured at 25° C. in 30% toluene solution, 20 parts of hydrophobic fumed silica having a specific surface area of about 130 m²/g, 5 part of hydrogenpolysiloxane represented by the following average formula:

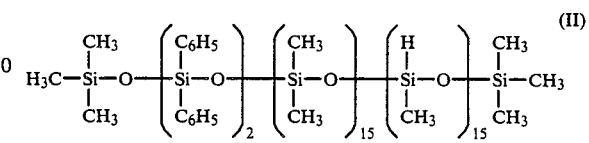

300 parts of toluene, and an ethylhexanol solution of 2% chloroplatinic acid in an amount sufficient to provide 30 ppm of platinum based on said diorganopolysiloxane raw rubber. To 100 parts of the mixture, 10 parts of red iron oxide as a red pigment was added and uniformly dispersed to complete the coating composition of Example 4.

The coating composition was knife coated to a plainwoven glass cloth having a thickness of 0.8 mm and then heat treated at 200° C. for 3 minutes, forming a film having a coating weight of 150 g/m².

The thus formed film had a uniform and tack-free surface, and was fully strong and flexible. The coated

TABLE 1

| Composition Black dye | Example 2 absent | | Example 3 present | | Comparative Example 2 absent | | Comparative Example 3 present | |
|---|---|---|---|---|---|---|---|---|
| Heating conditions | | | | | | | | |
| Temp., °C. | 150 | 180 | 150 | 180 | 150 | 180 | 150 | 180 |
| Time, min. | 10 | 60 | 10 | 60 | 10 | 60 | 10 | 60 |
| Film | | | | | | | | |
| Coating weight, g/m | 1.68 | 1.65 | 1.74 | 1.72 | 1.66 | 1.65 | 1.78 | 1.74 |
| Tack | tack-free | tack-free | tack free | tack free | tacky | tack-free | very tacky | tack-free |
| DBV, kV | | | | | | | | |
| Normal | 7.3 | 7.3 | 7.0 | 7.3 | 6.5 | 7.1 | 5.9 | 6.8 |
| Aged @ 100% RH, 24 hrs. | 7.0 | 7.1 | 6.8 | 7.0 | 5.3 | 6.8 | 3.1 | 5.7 |

As shown in Table 1, the coating compositions of the present invention irrespective of whether or not the black dye had been incorporated, resulted in tack-free films even when they were heat-treated at a relatively low temperature for a shorter time. The glass sleeves coated with the coating compositions of the present invention showed no substantial difference in DBV between the initial and after moisture absorption.

Among the coating compositions of Comparative Examples utilizing diorganopolysiloxane having monovinyldiorganosilyl radicals on both ends thereof, the black dye-free one was still tacky after heat curing at a low temperature for a short time. The glass sleeve coated therewith showed varying DBV, failing to provide stable electrical properties. For the black dye-containing one, the dielectric breakdown voltage of the glass sleeve varied widely even when it was heated at a higher temperature for a longer time, failing to exhibit stable electrical properties.

EXAMPLE 4

A coating composition was prepared by mixing 100 parts of diorganopolysiloxane raw rubber end-blocked with trivinylsilyl radical at both ends containing 3 mol % of phenyl radical and 0.15 mol % of vinyl radical in glass cloth was self-extinguishable. After the coated glass cloth was heated at 250° C. for 3 days, it was flexible and self-extinguishable maintaining excellent properties.

COMPARATIVE EXAMPLE 4

A coating composition was prepared as in Example 4 using the same dimethylpolysiloxane raw rubber as used in Example 4 except that it was end-blocked with a monovinyldimethylsily radical at both ends. A glass cloth was coated with this coating composition as in Example 4.

The coated film did not cure after a heat treatment at 150° C. for 15 minutes, and remained tacky after being heated at 180° C. for a further 15 minutes.

We claim:
1. A composition for coating glass fiber articles, comprising
   (a) a diorganopolysiloxane end-blocked with a divinylmonoorganosilyl or trivinylsilyl radical at both ends,
   (b) a sufficient amount of an organohydrogenpolysiloxane containing at least two silicon-bonded hydrogen atoms per molecule to provide at least

0.5 silicon-bonded hydrogen atoms per vinyl radical in component (a), and (c) a catalytic amount of platinum or a platinum compound.

2. The composition according to claim 1, wherein said diorganopolysiloxane (a) is one having the general formula:

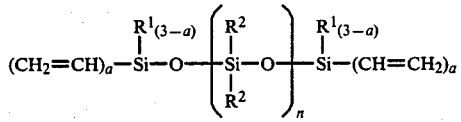 (1)

wherein $R^1$ is methyl or phenyl radical, $R^2$ is a monovalent hydrocarbon radical, "a" is a positive integer of 2 or 3, and "n" is an integer of at least 50.

3. The composition according to claim 1, wherein said organohydrogenpolysiloxane is selected from the group consisting of

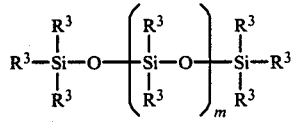 (2)

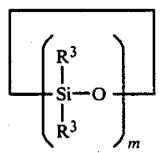 (3)

and

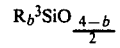 (4)

wherein $R^3$ is selected from hydrogen, alkyl or aryl radicals, or a mixture thereof, with the proviso that at least two $R^3$ radicals are hydrogen atoms, m is a positive integer of at least 3, and b is from 1.5 to 2.0.

4. The composition according to claim 1 which further comprises an inorganic filler in an amount of from 0 to 30 parts by weight per 100 parts by weight of component (a).

5. A glass fiber article coated with a cured layer obtained by curing the composition according to claim 2, wherein said glass fiber article comprises a member selected from the group consisting of glass sleeve, glass cloth, glass roving, glass tape, glass mat, and glass nonwoven fabric.

6. The glass fiber article according to claim 5, wherein said organohydrogenpolysiloxane is selected from the group consisting of

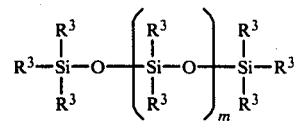 (2)

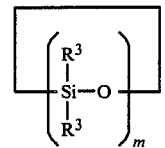 (3)

and

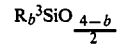 (4)

wherein $R^3$ is selected from hydrogen, alkyl or aryl radicals, or a mixture thereof, with the proviso that at least two $R^3$ radicals are hydrogen atoms, m is a positive integer of at least 3 and b is from 1.5 to 2.0.

7. The composition according to claim 2, wherein said organohydrogenpolysiloxane is selected from the group consisting of

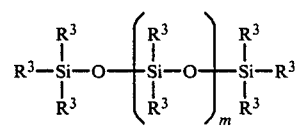 (2)

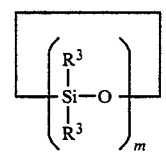 (3)

and

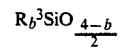 (4)

wherein $R^3$ is selected from hydrogen, alkyl or aryl radicals, or a mixture thereof, with the proviso that at least two $R^3$ radicals are hydrogen atoms, m is a positive integer of at least 3 and b is from 1.5 to 2.0.

8. The composition according to claim 7, which further comprises an inorganic filler in an amount of from 0 to 30 parts by weight per 100 parts by weight of component (a).

9. The composition according to claim 7, wherein $R^1$ and $R^2$ comprise at least 70 mol % of methyl radical content and up to 30 mol% of aryl radical content, wherein the vinyl radical content of said diorganopolysiloxane is not more than 0.5 mol %, and wherein n is in the range of from 500 to 10,000.

10. The composition according to claim 7, wherein $R^3$ comprises at least 90 mol % of methyl radical content and from 0 to 30 mol % of aryl radical content, and wherein m is from 5 to 500.

11. The composition according to claim 7, wherein said platinum is contained in an amount of from 5 to 50 parts of platinum per million parts by weight of component (a).

12. The composition according to claim 9, wherein $R^3$ comprises at least 90 mol % of methyl radical content and from 0 to 30 mol % of aryl radical content, and wherein m is from 5 to 500.

13. The composition according to claim 12, wherein said platinum is contained in an amount of from 5 to 50 parts of platinum per million parts by weight of component (a).

14. The composition according to claim 1, further comprising one or more additives in an amount of from 0 to 15 parts by weight per 100 parts by weight of component (a), wherein said additives are selected from the group consisting of retarders for extending the pot life thereof, flame retardants, heat resistance-imparting agents, and colorants.

15. The composition according to claim 7, further comprising one or more additives in an amount of from 0 to 15 parts by weight per 100 parts by weight of component (a), wherein said additives are selected from the group consisting of retarders for extending the pot life thereof, flame retardants, heat resistance-imparting agents, and colorants.

16. The glass fiber article according to claim 6, wherein said composition further comprises a pigment or dye additive in an amount of up to 15 parts by weight per 100 parts by weight of component (a).

* * * * *